United States Patent
Hong et al.

(12)

(10) Patent No.: US 11,325,650 B2
(45) Date of Patent: May 10, 2022

(54) VEHICLE BODY STRUCTURE

(71) Applicants: Hyundai Motor Company, Seoul (KR); Kia Motors Corporation, Seoul (KR)

(72) Inventors: Deok Hwa Hong, Suwon-si (KR); Hee Seouk Chung, Hwaseong-si (KR); Byeongcheon Lee, Seoul (KR); Hyunsik Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 143 days.

(21) Appl. No.: 16/934,959

(22) Filed: Jul. 21, 2020

(65) Prior Publication Data
US 2021/0114665 A1  Apr. 22, 2021

(30) Foreign Application Priority Data
Oct. 22, 2019  (KR) ........................ 10-2019-0131286

(51) Int. Cl.
| | |
|---|---|
| *B62D 21/15* | (2006.01) |
| *B62D 21/11* | (2006.01) |
| *B62D 25/16* | (2006.01) |
| *B62D 27/02* | (2006.01) |
| *B62D 65/12* | (2006.01) |
| *B62D 65/16* | (2006.01) |

(52) U.S. Cl.
CPC ............ *B62D 21/152* (2013.01); *B62D 21/11* (2013.01); *B62D 25/16* (2013.01); *B62D 27/023* (2013.01); *B62D 65/12* (2013.01); *B62D 65/16* (2013.01)

(58) Field of Classification Search
CPC ...... B62D 21/152; B62D 21/11; B62D 25/16; B62D 27/023; B62D 65/12; B62D 65/16; B62D 21/15; B62D 21/00
See application file for complete search history.

(56) References Cited

U.S. PATENT DOCUMENTS 5,267,630 A * 12/1993 Watanabe ................. F16F 7/00
   180/312
2017/0158246 A1* 6/2017 Kang .................. B62D 25/081

FOREIGN PATENT DOCUMENTS

CN      103625563 A  *  3/2014  ............. B62D 25/08

* cited by examiner

*Primary Examiner* — Lori L Lyjak
(74) *Attorney, Agent, or Firm* — Slater Matsil, LLP

(57) ABSTRACT

A vehicle body structure includes a fender apron member, a shock absorber housing joined to the fender apron member, and a side reinforcement member configured to connect the fender apron member and the shock absorber housing to a lower side of a front pillar and reinforce a side surface of an engine room, wherein the shock absorber housing and the side reinforcement member comprise stepped joining portions corresponding to and joined to each other.

14 Claims, 15 Drawing Sheets

VEHICLE BODY STRUCTURE

CROSS-REFERENCE TO RELATED APPLICATIONS

This application claims the benefit Korean Patent Application No. 10-2019-0131286, filed on Oct. 22, 2019, in the Korean Intellectual Property Office, which application is hereby incorporated herein by reference.

TECHNICAL FIELD

The disclosure relates to a vehicle body structure capable of increasing rigidity of a fender apron region.

BACKGROUND

A typical vehicle body structure may include a fender apron member, a shock absorber housing, and a side reinforcement member connected to the fender apron member and the shock absorber housing. The side reinforcement member may be connected to a lower end of a front pillar and a dash panel to reinforce a side surface of an engine room.

The shock absorber housing and the fender apron member are mutually joined by welding, bolting, riveting, and the like. The side reinforcement member is also joined to the shock absorber housing and the fender apron member in the same way. The respective parts may include flange shaped joining portions that are mutually joined.

A collision load in a front direction, a vertical load due to the weight of a vehicle, and a lateral load due to driving conditions may act on the above vehicle body structure, and the above loads may also act on portions where the respective parts are joined.

Because a shear load acts in a direction coinciding with a direction of a joining surface due to loads acting on the joining portions, there is a limit to increasing rigidity of the fender apron member, the shock absorber housing, and a lower support member of a typical vehicle body structure. A horizontal direction joining surface may be vulnerable to the collision load and the lateral load because the shear load due to the collision load and the lateral load acts in the direction coinciding with the direction of the joining surface. Conversely, a vertical direction joining surface may be vulnerable to a vertical load because the shear load due to the vertical load acts in the direction coinciding with the direction of the joining surface.

SUMMARY

An embodiment of the disclosure provides a vehicle body structure capable of increasing rigidity of a joining region of parts located in a fender apron region.

Another embodiment of the disclosure provides a vehicle body structure capable of smoothly dispersing the load acting on a fender apron region.

Additional embodiments of the disclosure will be set forth in part in the description which follows and, in part, will be obvious from the description, or may be learned by practice of the disclosure.

In accordance with an embodiment of the disclosure, a vehicle body structure includes a fender apron member, a shock absorber housing joined to the fender apron member, and a side reinforcement member configured to connect the fender apron member and the shock absorber housing to a lower side of a front pillar and reinforce a side surface of an engine room, wherein the shock absorber housing and the side reinforcement member comprise stepped joining portions corresponding to and joined to each other.

The stepped joining portion may include one or more longitudinal joining portions facing a front collision load direction, and one or more transverse joining portions facing a lateral load direction.

The stepped joining portion may include one or more inclined joining portions facing a lateral load direction in a state of being inclined, and one or more vertical joining portions facing a vertical load direction.

Joining portions of the fender apron member and the shock absorber housing may include one or more vertical joining portions facing a vertical load direction, one or more longitudinal joining portions facing a front collision load direction, and one or more transverse joining portions facing a lateral load direction.

Joining portions of the fender apron member and the side reinforcement member may include one or more vertical joining portions facing a vertical load direction, and one or more transverse joining portions facing a lateral load direction.

The shock absorber housing may include an expansion portion having opposite sides expanded in an arcuate shape in a form in which a width of an upper surface portion gradually widens toward one side joined to the fender apron member.

The vehicle body structure may further include a first reinforcement portion extending from the fender apron member to cover outer sides of the joining portions of the shock absorber housing and the side reinforcement member and joined to outer surfaces of the shock absorber housing and the side reinforcement member, and a second reinforcement portion separately adhered to the outer surfaces to reinforce joining portions of the side reinforcement member and the shock absorber housing.

BRIEF DESCRIPTION OF THE DRAWINGS

These and/or other aspects of the disclosure will become apparent and more readily appreciated from the following description of the embodiments, taken in conjunction with the accompanying drawings, in which.

DETAILED DESCRIPTION

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
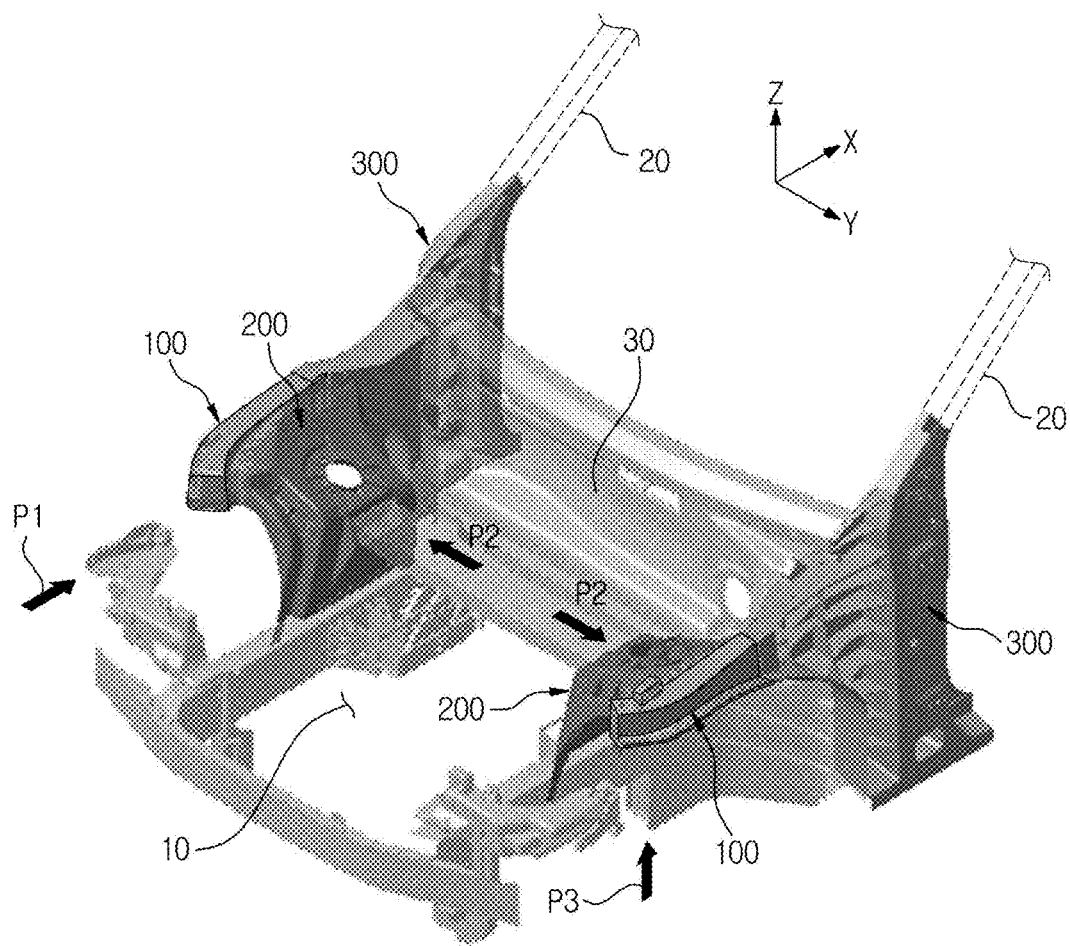
FIG. 1 is a front perspective view of a vehicle body structure according to an embodiment of the disclosure.
Figure 2:
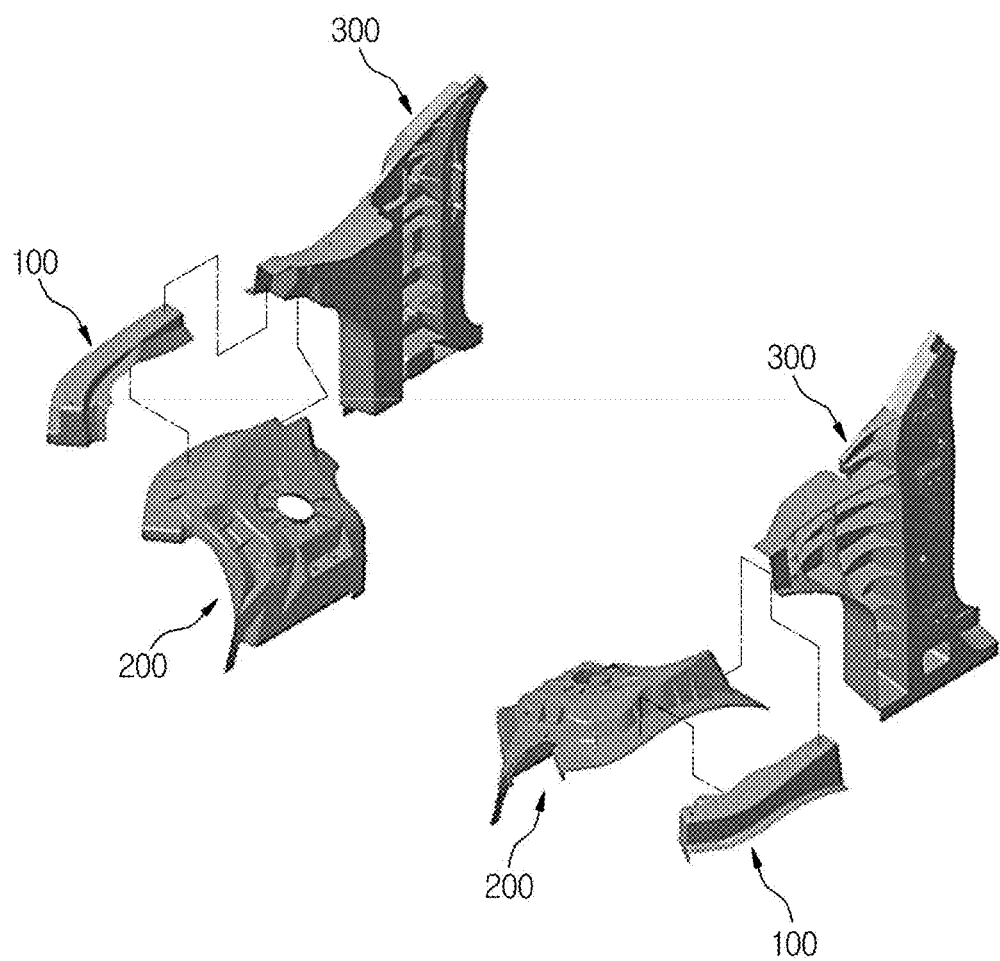
FIG. 2 is a perspective view of fender apron members, shock absorber housings, and side reinforcement members of the vehicle body structure according to an embodiment of the disclosure.

Referring to FIGS. 1 and 2, a vehicle body structure according to an embodiment of the disclosure includes fender apron members 100, shock absorber housings 200, and side reinforcement members 300.

The fender apron members 100 are respectively provided on opposite side upper portions of an engine room 10 and extend in the front-rear direction. The fender apron members 100 increase a longitudinal (X direction) rigidity of opposite side upper portions of the vehicle body structure and form a skeleton of an inner side of a front fender.

The shock absorber housings 200 are respectively disposed on opposite sides of the engine room 10 and support an upper side of front shock absorbers in a state in which upper portions thereof are coupled to the fender apron members 100.

The side reinforcement members 300 are respectively provided on opposite rear sides of the engine room 10 to reinforce a rear side of the engine room 10. The side reinforcement member 300 is disposed such that a front upper side thereof is connected to the fender apron member 100 and the shock absorber housing 200, and a rear upper side thereof is connected to a front pillar 20 of the vehicle body structure.

The side reinforcement member 300 extends in the longitudinal direction (X direction) from the fender apron member 100 to be connected to a lower side of the front pillar 20, so that rigidity with respect to a front collision load P1 may be increased and the front collision load P1 may be transmitted and dispersed to the front pillar 20. The opposite side reinforcement members 300 are respectively connected to opposite ends of a dash panel 30 behind the engine room 10.

The fender apron member 100 and the shock absorber housing 200 are mutually joined by welding, bolting, riveting and the like, and the side reinforcement member 300 is also joined to the shock absorber housing 200 and the fender apron member 100 in the same way.

Referring to FIGS. 3 to 6, the shock absorber housing 200 includes an upper surface portion 210 having a coupling hole 211 to which an upper end of the shock absorber is coupled, and a vertical joining portion 220 extending in a flange shape from a side of the upper surface portion 210 for coupling with the fender apron member 100. The shock absorber housing 200 includes an extension portion 230 extending obliquely downward to reinforce a circumference of the upper surface portion 210, and the vertical joining portion 220 extends in a lateral direction from a lower end of the extending portion 230.

Figure 6:
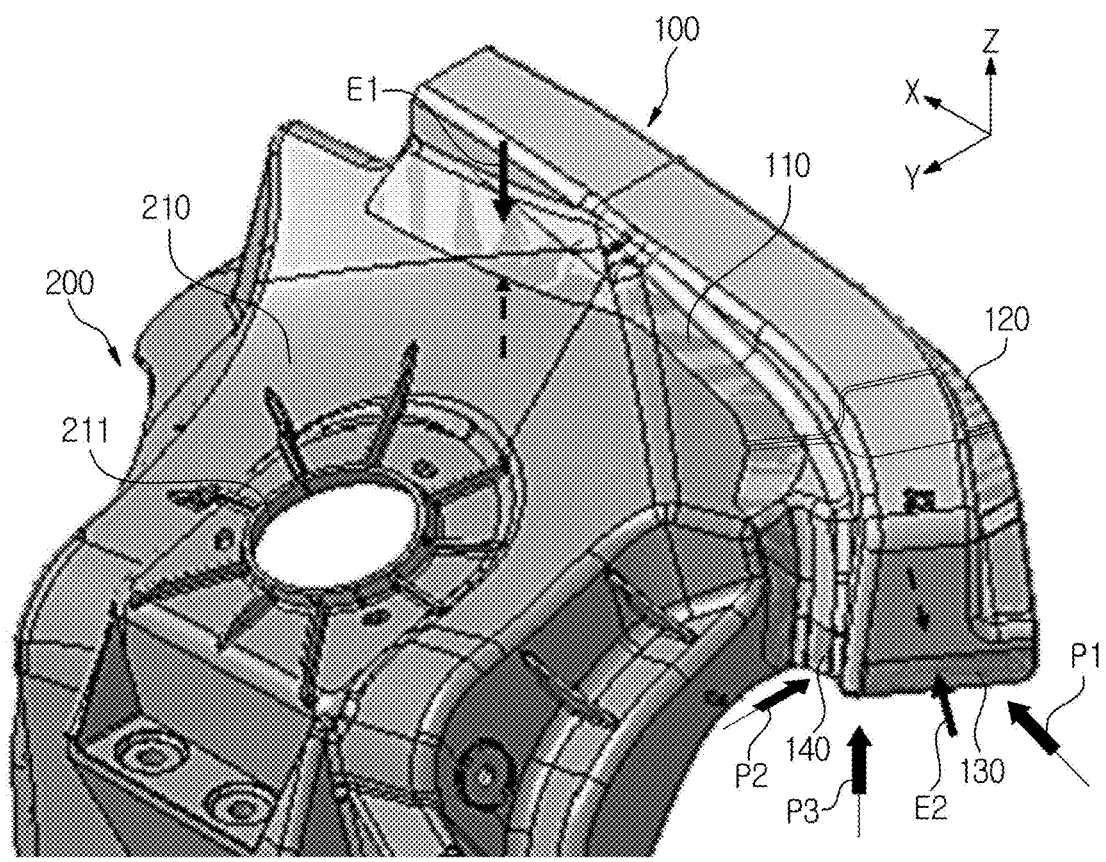
FIG. 6 is a perspective view showing a state in which the shock absorber housing and the fender apron member of the vehicle body structure according to an embodiment of the disclosure are joined.

As shown in FIG. 6, the fender apron member 100 may be joined to the fender shock absorber housing 200 in a form covering an upper side of the vertical joining portion 220 of the fender shock absorber housing 200. The fender apron member 100 has a 'E' shaped cross section with an open lower side and extends in the longitudinal direction (X direction).

The fender apron member 100 includes vertical joining portions no and 120 extending in a flange shape on opposite sides thereof. A lower surface of the vertical joining portion no on one side is joined to the upper surface portion 210 of the shock absorber housing 200, and a lower surface of the vertical joining portion 120 on the other side is joined to an upper surface of the vertical joining portion 220 of the shock absorber housing 200.

As shown in FIG. 6, the fender apron member 100 may form a quadrangular channel type structure extending in the longitudinal direction (X direction) together with the fender shock absorber housing 200 in a state of being coupled with the fender shock absorber housing 200. Therefore, the vehicle body structure of a fender apron region may increase the rigidity with respect to the front collision load P1. In addition, because the opposite vertical joining portions no and 120 of the fender apron member ism joined to the shock absorber housing 200 are disposed such that joining surfaces thereof face a vertical load $P_3$, rigidity of a joining region with respect to the vertical load $P_3$ may be increased.

Figure 5:
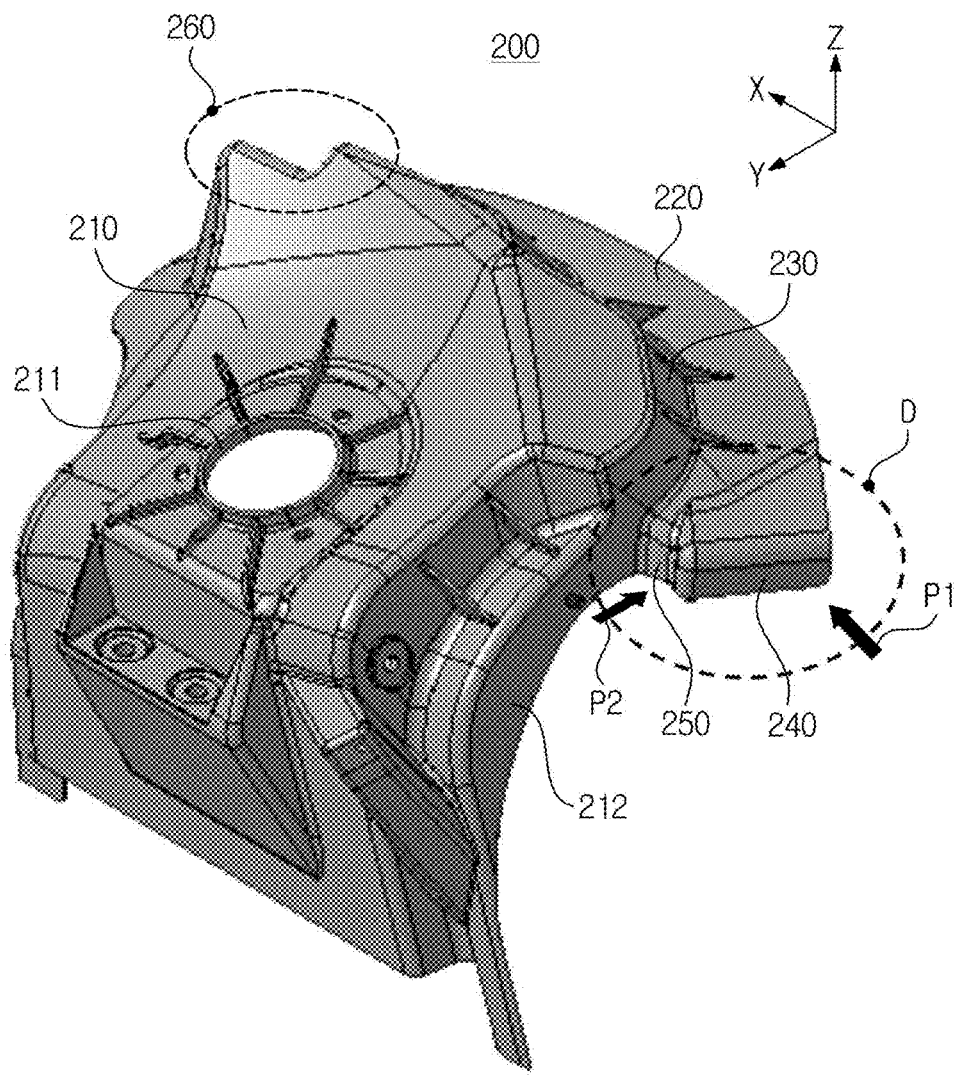

As shown in FIG. 5, the shock absorber housing 200 includes a longitudinal joining portion 240 extending downward from a front end of the vertical joining portion 220 for joining with the fender apron member 100 and facing the front collision load P1 direction, and a transverse joining portion 250 connecting the longitudinal joining portion 240 and a side surface portion 212 of the shock absorber housing 200 and facing the lateral load P2 direction (a portion D of FIG. 5). The fender apron member 100 includes a longitudinal joining portion 130 and a transverse joining portion 140 which are joined to the corresponding longitudinal joining portion 240 and transverse joining portion 250 of the shock absorber housing 200, respectively. In FIG. 6, arrows E1 and E2 indicate directions of being joined to each other by spot welding or the like.

Because the fender apron member 100 includes the vertical joining portions no and 120 facing the vertical load P3 direction, the longitudinal joining portion 130 facing the front collision load P1 direction, and the transverse joining portion 140 facing the lateral load P2, the rigidity of the joining region joined to the shock absorber housing 200 may significantly be increased compared to the prior art. The vertical joining portions 110 and 120 may increase rigidity with respect to the vertical load P3, the longitudinal joining portion 130 may increase rigidity with respect to the front collision load P1, and the transverse joining portion 140 may increase rigidity with respect to the lateral load P2.

Figure 7:
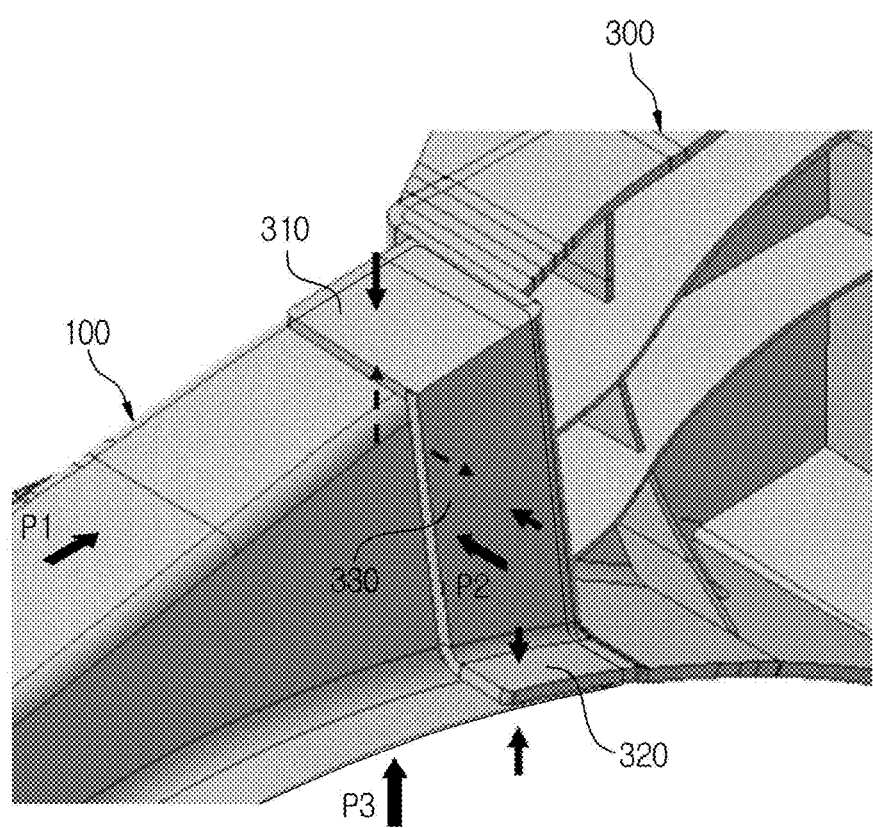
FIG. 7 is a perspective view showing a state in which the fender apron member and the side reinforcement member of the vehicle body structure according to an embodiment of the disclosure are joined.
Figure 8:
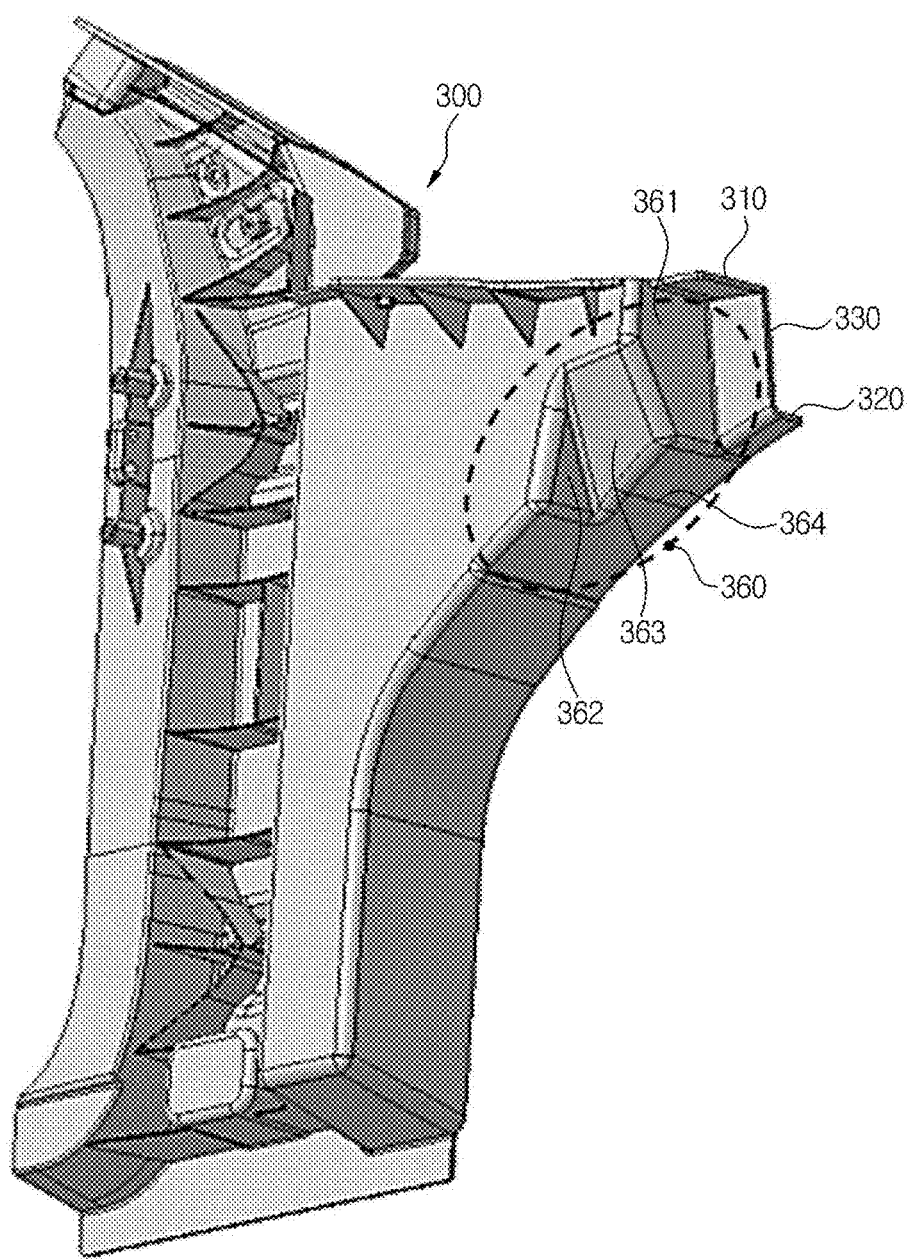
FIG. 8 is a perspective view of the side reinforcement member of the vehicle body structure according to an embodiment of the disclosure.

Referring to FIG. 7, a joining portion of the side reinforcement member 300 to be joined to the fender apron member 100 may be joined to cover a portion of the rear end of the fender apron member 100. The joining portion of the side reinforcement member 300 may include an upper vertical joining portion 310 and a lower vertical joining portion 320 which face the vertical load P3 direction, and a transverse joining portion 330 facing the lateral load P2 direction. Accordingly, the joining portions of the fender apron member 100 and the side reinforcement member 300 may also increase the rigidity with respect to the vertical load P3 and the lateral load P2. In addition, because the apron member 100 and the side reinforcement member 300 are joined in a state of being supported to face each other in the longitudinal direction, the rigidity of the joining region with respect to the front collision load P1 may be increased.

Figure 9:
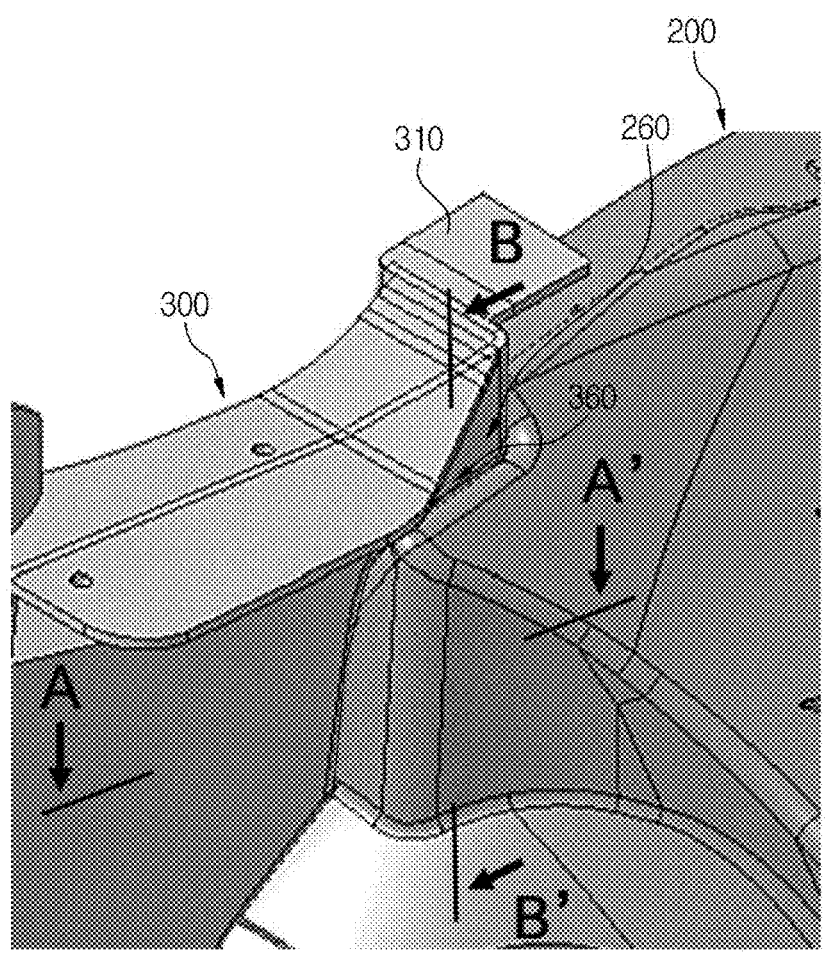
FIG. 9 is a perspective view showing a state in which the shock absorber housing and the side reinforcement member of the vehicle body structure according to an embodiment of the disclosure are joined.
Figure 10:
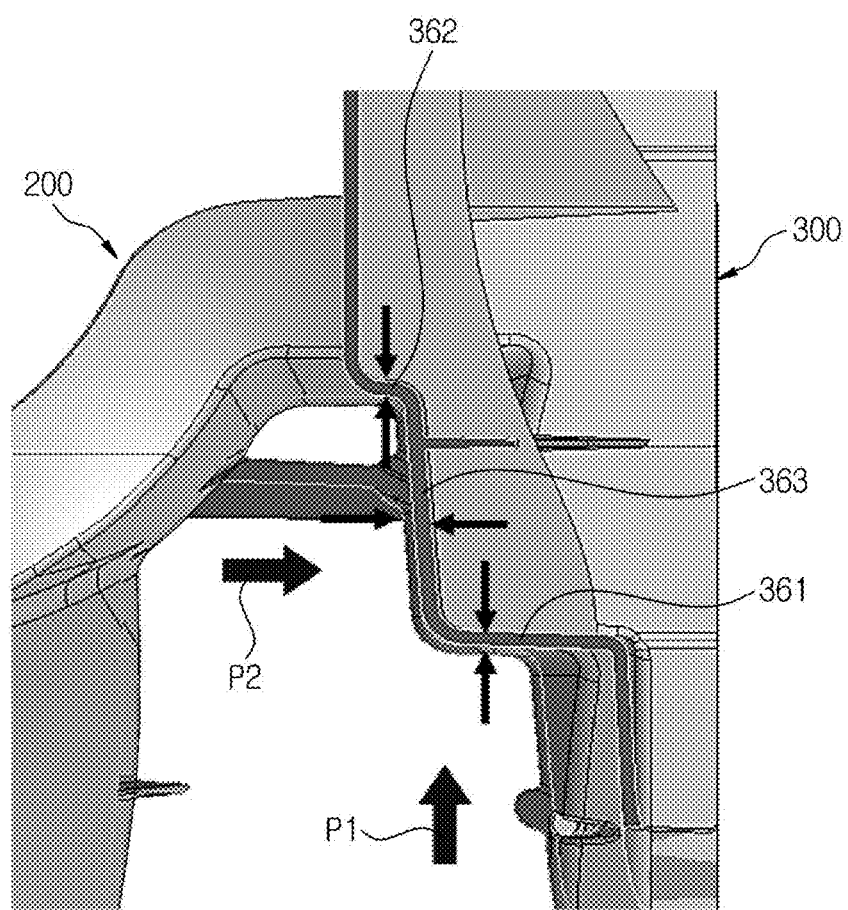
FIG. 10 is a cross-sectional view taken along line A-A' in FIG. 9.
Figure 11:
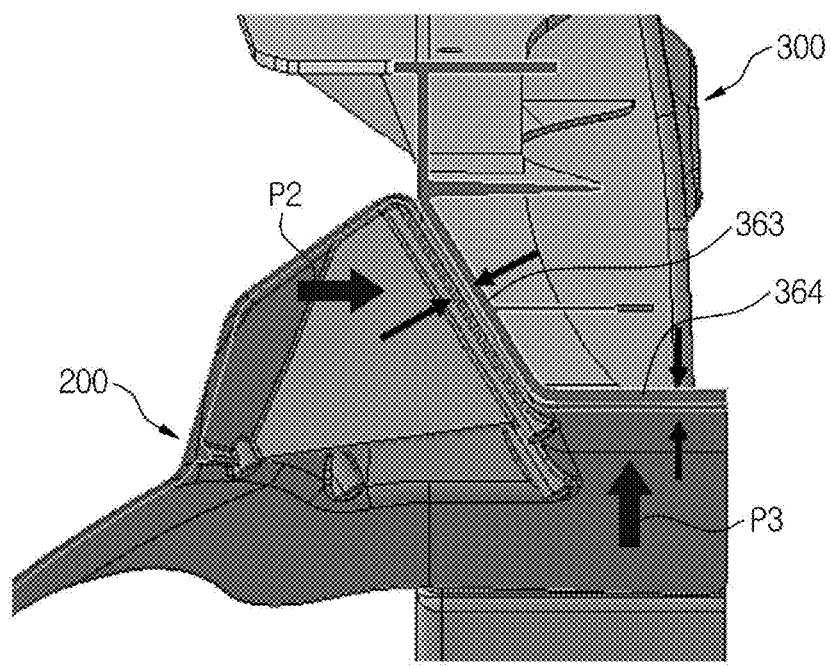
FIG. 11 is a cross-sectional view taken along line B-B' in FIG. 9.

Referring to FIGS. 4 and 8 to 11, the shock absorber housing 200 and the side reinforcement member 300 include stepped joining portions 260 and 360 that are joined to correspond to each other. FIG. 9 shows a state in which the stepped joining portion 260 of the shock absorber housing 200 and the stepped joining portion 360 of the side reinforcement member 300 are mutually joined. FIG. 10 is a cross-sectional view taken along line A-A' in FIG. 9, and FIG. 11 is a cross-sectional view taken along line B-B' in FIG. 9.

The stepped joining portion 360 of the side reinforcement member 300 includes a plurality of longitudinal joining portions 361 and 362 in which joining surfaces face the front collision load P1 direction, one or more inclined joining portions 363 facing the lateral load P2 direction or the vertical load P3 direction in an inclined state, and one or more vertical joining portions 364 facing the vertical load P3 direction. The stepped joining portion 260 of the shock absorber housing 200 is also provided in a shape corresponding thereto. The stepped joining portions 260 and 360 may be formed to vary in number or direction of joining portions according to design. Although not shown in the drawings, one or more transverse joining portions facing the lateral load P2 direction may also be included.

Because the side reinforcement member 300 is joined to the stepped joining portion 260 of the shock absorber housing 200 by the stepped joining portion 360 including the plurality of longitudinal joining portions 361 and 362, the inclined joining portion 363, the vertical joining portion 364, and the transverse joining portion, the rigidity of the joining region may be increased.

As such, because the vehicle body structure according to the present embodiment is designed such that the joining portions of the parts located in the fender apron region may withstand the loads acting in various directions, the rigidity of the vehicle body structure may significantly be increased compared to the prior art.

Figure 12:
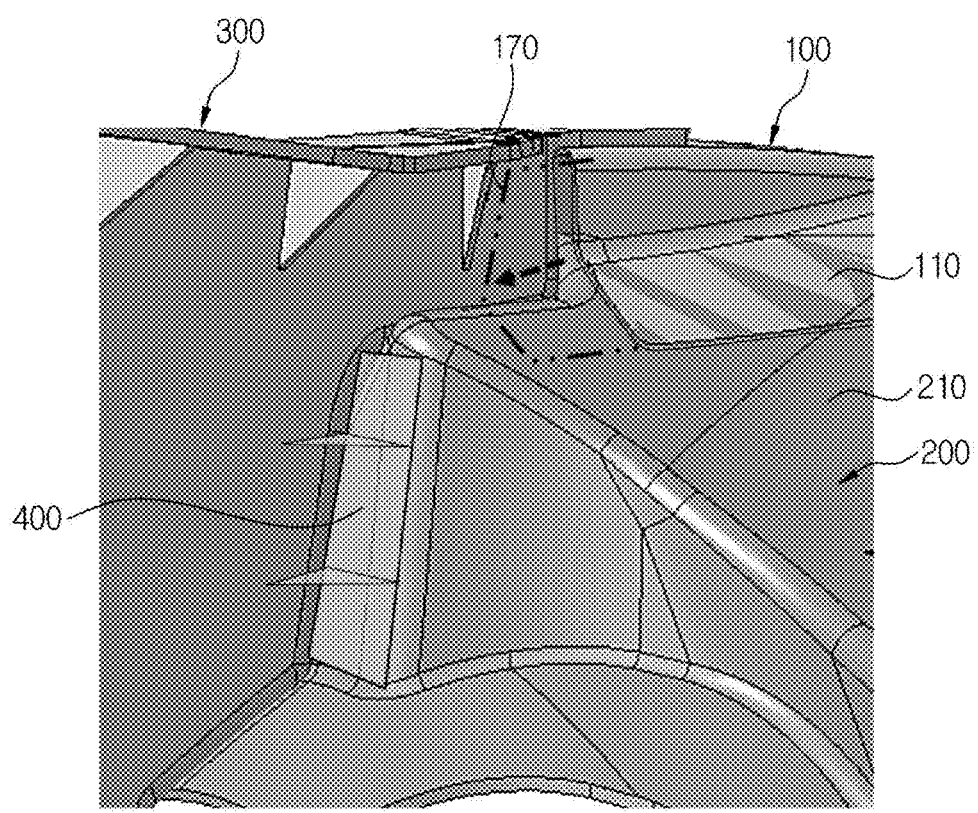
FIG. 12 is a perspective view showing a first reinforcement portion extending from the fender apron member of the vehicle body structure according to an embodiment of the disclosure and a second reinforcement portion for reinforcing a joining portion of the side reinforcement member and the shock absorber housing.

Referring to FIG. 12, the vehicle body structure of the present embodiment may include a first reinforcement portion 170 extending from the fender apron member 100 to cover outer sides of the joining portions of the shock absorber housing 200 and the side reinforcement member 300 and joined to outer surfaces of the shock absorber housing 200 and the side reinforcement member 300. Also, the vehicle body structure of the present embodiment may include a second reinforcement portion 400 separately adhered to the outer surfaces to reinforce the joining portions of the side reinforcement member 300 and the shock absorber housing 200.

Figure 3:
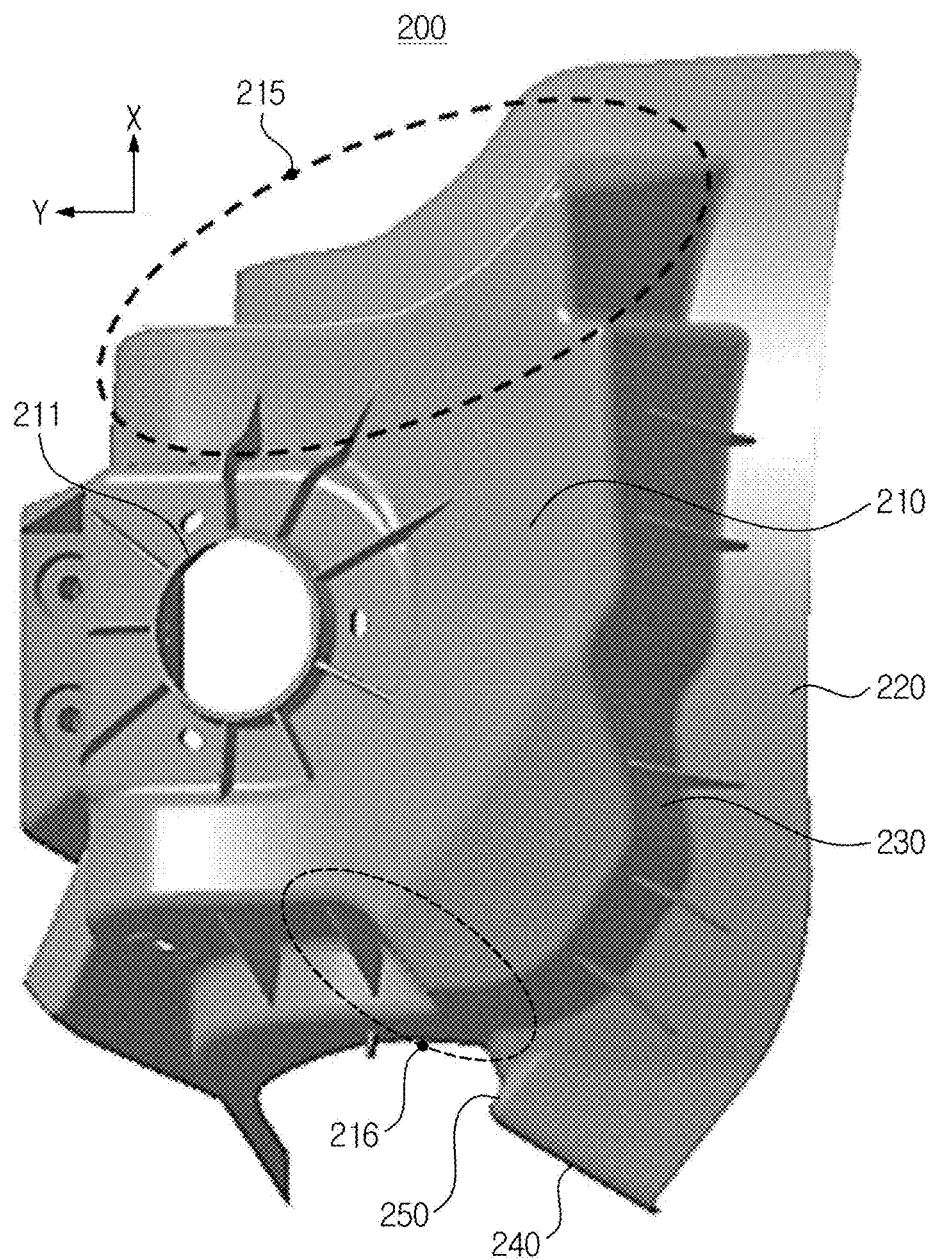
FIGS. 3 to 5 are perspective views of the shock absorber housing of the vehicle body structure according to an embodiment of the disclosure, viewed from various directions.
Figure 4:
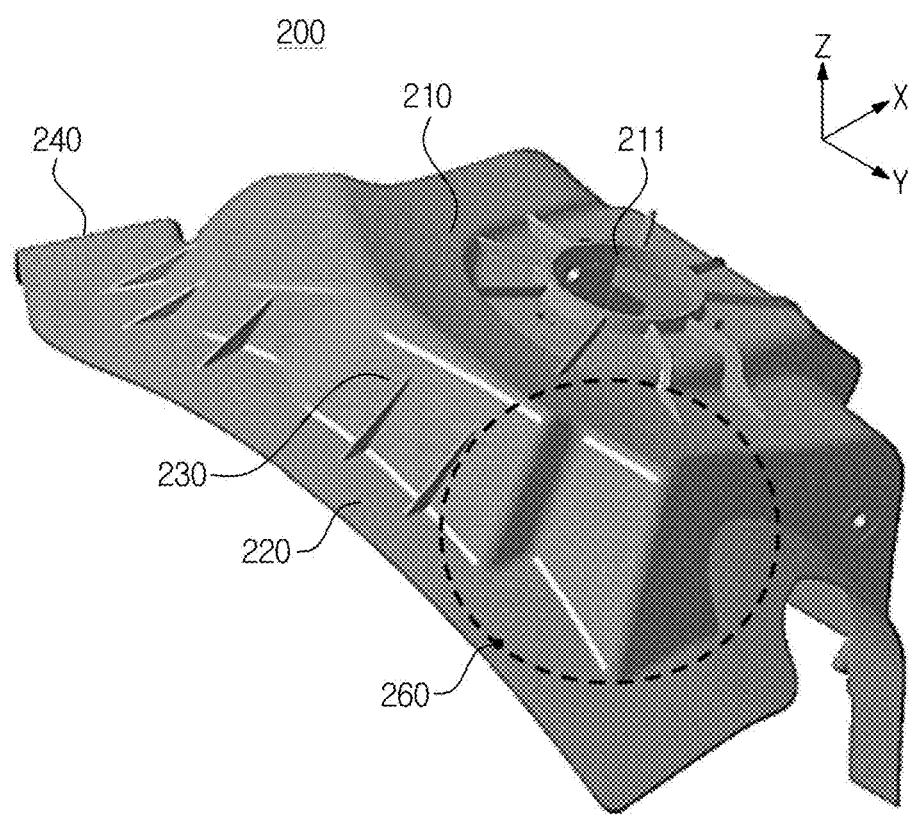
Figure 13:
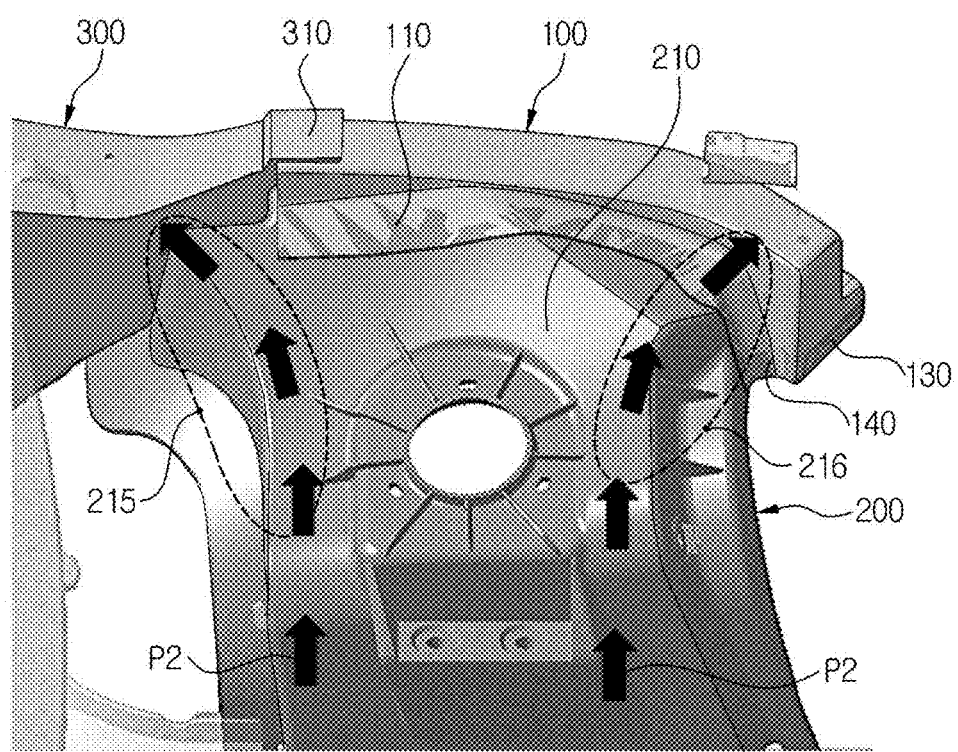
FIG. 13 shows transmission paths of a lateral load acting on the vehicle body structure according to an embodiment of the disclosure.

As shown in FIGS. 3 and 13, the shock absorber housing 200 may include expansion portions 215 and 216 having opposite sides expanded in an arcuate shape in a form in which a width of the upper surface portion 210 gradually widens toward sides which are joined to the fender apron member 100 and the side reinforcement member 300.

Figure 14:
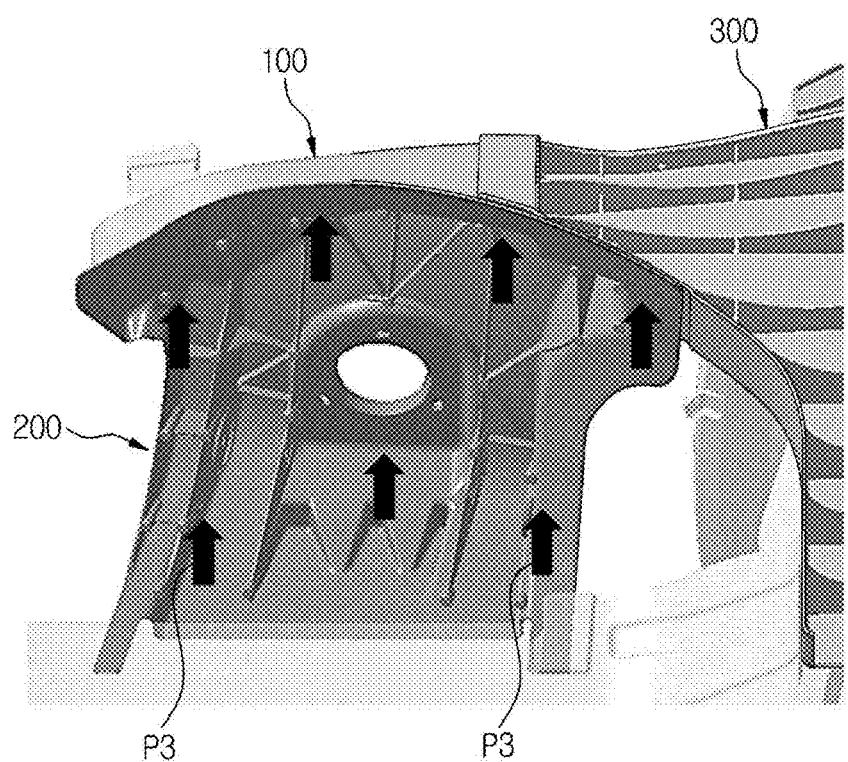
FIG. 14 shows transmission paths of a vertical load acting on the vehicle body structure according to an embodiment of the disclosure.

The shock absorber housing 200 as described above may further increase the rigidity of the joining portions by expanding regions joined to the fender apron member 100 and the side reinforcement member 300. Also, as shown in FIGS. 13 and 14, the lateral load P2 and the vertical load P3 acting on the shock absorber housing 200 may be smoothly dispersed toward the fender apron member 100 and the side reinforcement member 300.

Figure 15:
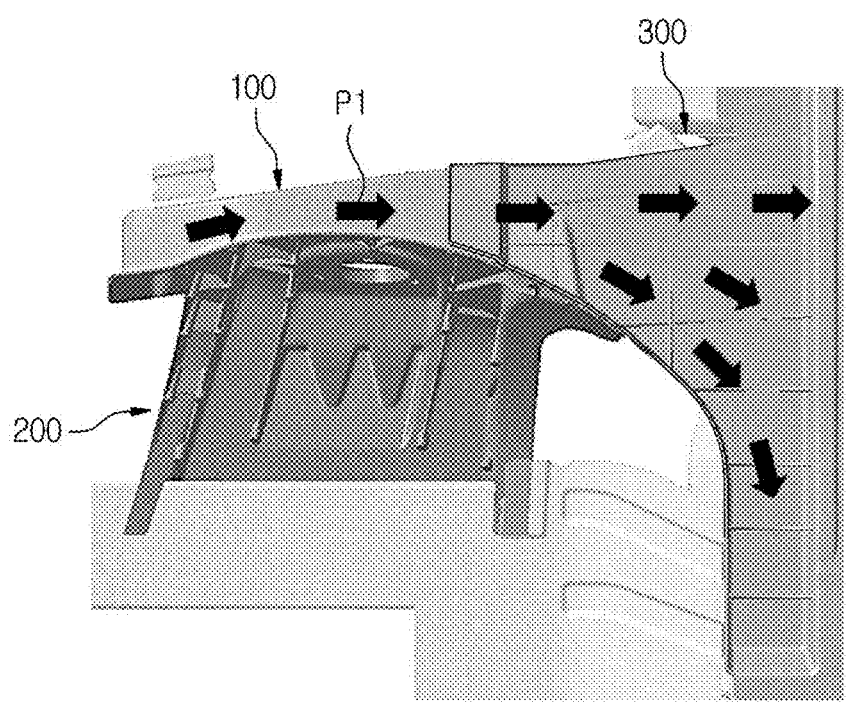
FIG. 15 shows transmission paths of a front collision load acting on the vehicle body structure according to an embodiment of the disclosure.

In addition, as shown in FIG. 15, the vehicle body structure according to the present embodiment may smoothly disperse the front collision load P1 acting in the longitudinal direction on the apron region to upper and lower sides of the side reinforcement member 300 through the fender apron member 100.

As is apparent from the above, because a vehicle body structure according to an embodiment of the disclosure is designed such that joining portions of the parts located in a fender apron region withstands loads acting in various directions, the rigidity of the vehicle body structure may significantly be increased compared to the prior art.

Further, in the vehicle body structure according to an embodiment of the disclosure, a shock absorber housing joined to a fender apron member and a side reinforcement member includes arcuate shaped expansion portions for expanding joining regions, so that loads acting on a fender apron region can be dispersed smoothly.

What is claimed is:

1. A vehicle body structure comprising:
   a fender apron member;
   a shock absorber housing joined to the fender apron member; and
   a side reinforcement member configured to connect the fender apron member and the shock absorber housing to a lower side of a front pillar and to reinforce a side surface of an engine room, wherein the shock absorber housing and the side reinforcement member comprise stepped joining portions corresponding to and joined to each other.

2. The vehicle body structure according to claim 1, wherein the stepped joining portions comprise:
   one or more longitudinal joining portions facing a front collision load direction; and
   one or more transverse joining portions facing a lateral load direction.

3. The vehicle body structure according to claim 1, wherein the stepped joining portions comprise:
   one or more inclined joining portions facing a lateral load direction in a state of being inclined; and
   one or more vertical joining portions facing a vertical load direction.

4. The vehicle body structure according to claim 1, wherein joining portions of the fender apron member and the shock absorber housing comprise:
   one or more vertical joining portions facing a vertical load direction;
   one or more longitudinal joining portions facing a front collision load direction; and one or more transverse joining portions facing a lateral load direction.

5. The vehicle body structure according to claim 1, wherein joining portions of the fender apron member and the side reinforcement member comprise:
- one or more vertical joining portions facing a vertical load direction; and
- one or more transverse joining portions facing a lateral load direction.

6. The vehicle body structure according to claim 1, wherein the shock absorber housing comprises an expansion portion having opposite sides expanded in an arcuate shape in a form in which a width of an upper surface portion gradually widens toward one side joined to the fender apron member.

7. The vehicle body structure according to claim 1, further comprising:
- a first reinforcement portion extending from the fender apron member to cover outer sides of the joining portions of the shock absorber housing and the side reinforcement member and joined to outer surfaces of the shock absorber housing and the side reinforcement member; and
- a second reinforcement portion separately adhered to the outer surfaces to reinforce joining portions of the side reinforcement member and the shock absorber housing.

8. A vehicle comprising:
- a front pillar;
- a dash panel;
- a fender apron member;
- a shock absorber housing joined to the fender apron member; and
- a side reinforcement member connected to the fender apron member, the shock absorber housing, a lower end of the front pillar, and the dash panel, wherein the shock absorber housing and the side reinforcement member comprise stepped joining portions corresponding to and joined to each other.

9. The vehicle according to claim 8, wherein the stepped joining portions comprise:
- one or more longitudinal joining portions facing a front collision load direction; and
- one or more transverse joining portions facing a lateral load direction.

10. The vehicle according to claim 8, wherein the stepped joining portions comprise:
- one or more inclined joining portions facing a lateral load direction in a state of being inclined; and
- one or more vertical joining portions facing a vertical load direction.

11. The vehicle according to claim 8, wherein joining portions of the fender apron member and the shock absorber housing comprise:
- one or more vertical joining portions facing a vertical load direction;
- one or more longitudinal joining portions facing a front collision load direction; and
- one or more transverse joining portions facing a lateral load direction.

12. The vehicle according to claim 8, wherein joining portions of the fender apron member and the side reinforcement member comprise:
- one or more vertical joining portions facing a vertical load direction; and
- one or more transverse joining portions facing a lateral load direction.

13. The vehicle according to claim 8, wherein the shock absorber housing comprises an expansion portion having opposite sides expanded in an arcuate shape in a form in which a width of an upper surface portion gradually widens toward one side joined to the fender apron member.

14. The vehicle according to claim 8, further comprising:
- a first reinforcement portion extending from the fender apron member to cover outer sides of the joining portions of the shock absorber housing and the side reinforcement member and joined to outer surfaces of the shock absorber housing and the side reinforcement member; and
- a second reinforcement portion separately adhered to the outer surfaces to reinforce joining portions of the side reinforcement member and the shock absorber housing.

* * * * *